United States Patent

[11] 3,616,414

| [72] | Inventor | Jan Van Houwelingen<br>Amersfoort, Netherlands |
|---|---|---|
| [21] | Appl. No. | 783,999 |
| [22] | Filed | Dec. 16, 1968 |
| [45] | Patented | Oct. 26, 1971 |
| [73] | Assignee | Electrofact N.V.<br>Amersfoort, Netherlands |
| [32] | Priority | Dec. 18, 1967 |
| [33] | | Netherlands |
| [31] | | 6717256 |

[54] REFERENCE ELECTRODE
9 Claims, 1 Drawing Fig.

[52] U.S. Cl. .................................................. 204/195
[51] Int. Cl. .................................................. G01n 27/46
[50] Field of Search .......................................... 204/1.1, 195

[56] References Cited
UNITED STATES PATENTS
2,595,042 4/1952 Wyllie .......................... 204/195
2,930,967 3/1960 Laird et al. .................. 204/195
3,445,366 5/1969 Vermeer ...................... 204/195
3,463,717 8/1969 Koopman et al. ............ 204/195
3,463,718 8/1969 Detemple .................... 204/195

FOREIGN PATENTS
1,172,448 6/1964 Germany ......................

*Primary Examiner*—T. Tung
*Attorney*—McGlew and Toren

ABSTRACT: A reference electrode for measuring ion potentials is composed of a tubular member forming a housing with another tubular member located within the housing and dividing it into a pair of chambers in communication with one another, each containing a different fluid. One of the chambers contains an electrolyte and has exit apertures to leak the electrolyte into the fluid being measured. By the syphon principle the fluid being measured enters the other chamber while the electrolyte leaks from the one chamber.

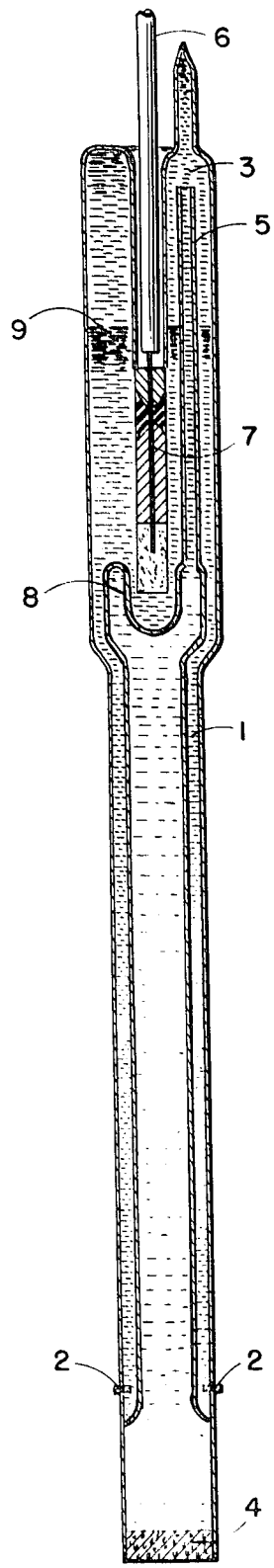

REFERENCE ELECTRODE

The invention relates to a reference electrode for measuring ion potentials, with a chamber into which an electrode lead projects and from which a reference electrolyte leaks out of the electrode in operation.

The German Auslegeschrift Pat. No. 1.172.448 describes an electrode of this kind, provided with two chambers connected with one another, one chamber comprising a narrow exit aperture through which electrolyte present in that chamber can leak out of the electrode, the other chamber comprising a silicone fluid with a lower specific gravity than the electrolyte and also being in communication with the space outside the electrode, the exit aperture being nearer the end of the reference electrode than the port through which the chamber containing silicon fluid communicates with the spaced outside the reference electrode. It is important that there by a continuous, though small leakage of electrolyte from the reference electrode and that the flow through the exit aperture never be reversed, for in that case the electrolyte in the reference electrode would be contaminated by process fluid entering the electrode and there would also be a risk of clogging of the exit aperture by contamination of the process fluid. In the device described, leakage of the electrolyte through the exit aperture is based upon the assumption that the reference electrolyte specific gravity exceeds the specific gravity of the fluid outside the reference electrode. This makes it impossible to use the reference electrode in a process fluid with high specific gravity, such as a slurry or suspension of heavy solid particles. Also, the rate at which reference electrolyte leaks from the electrode is dependent upon the specific gravity of the process fluid, being higher as the specific of the process fluid is lower. The useful life of the electrode therefore depends upon the specific gravity of the process fluid in which it is being used.

The invention provides a reference electrode, the operation of which is based upon the syphon principle.

More specifically, the invention provides a reference electrode for measuring ion potentials, comprising two chambers connected with one another, one chamber comprising a narrow exit aperture through which electrolyte present in that chamber can leak from the electrode, the other chamber comprising a silicone fluid with a lower specific gravity than the electrolyte and also communicating with the space outside the electrode, wherein the exit aperture of the first chamber is at least at an equal distance from the electrode and as the port through which the second chamber communicates with the space outside the electrode, the location where the two chambers communicate being at a larger distance from the end than the exit aperture.

Provided that the shape and dimensions of the various chambers are chosen suitably, the operation of this electrode depends entirely upon the differences in specific gravity of the fluid in the two chambers, which can be considered as the two legs of a continuous channel in the form of an inverted U.

The invention will be further described below with reference to the drawing, which shows a section through a reference electrode according to the invention.

The reference electrolyte 1, which here consists of a saturated potassium chloride solution with a specific gravity of approximately 1.20, is contained in an annular chamber of the reference electrode and can slowly leak from one or more narrow exit apertures 2 at the lower end of that chamber. A silicone fluid 3 with a specific gravity of approximately 0.85 is contained in a central chamber of the reference electrode and this chamber at the lower end communicates with the space around the reference electrode through a porous plug 4. The viscosity of the silicone fluid 3 is so great as to make it impossible for that fluid to flow through the porous plug 4, but the porous plug is chosen such that it passes the aqueous fluids in which measurements are usually made. As the central chamber and the annular chamber at their upper end communicate through the tube 5, there constitute two communicating vessels, one leg of which is entirely filled with a relatively light fluid (the silicone fluid 3), and the other leg being filled for the larger part with a relatively heavy fluid (the saturated potassium chloride solution). Thereby, the static pressure at the exit apertures 2 is somewhat higher than the static pressure at the porous plug 4 and this is sufficient for ensuring that potassium chloride solution continually leaks from the exit apertures 2. For replacing the potassium chloride solution leaked from the reference electrode, a little of the fluid surrounding the reference electrode is being drawn into the reference electrode through the porous plug 4, but the column of silicone fluid 3 effectively separates this ambient fluid from the potassium chloride solution 1, so that the potassium chloride solution cannot be contaminated by the ambient fluid.

Variations of the ambient pressure at the porous plug 4, through the plug 4, the column of silicone fluid 3 and the potassium chloride solution 1 cause corresponding pressure variations at the exit aperture 2, so that the differential pressure between the porous plug 4 and the exit apertures 2 remains constant, irrespective of the variations of the ambient pressure. For that reason, ambient pressure variations have no influence on the leakage of reference electrolyte from the exit apertures 2.

As usual, the reference electrode is provided with a connecting cord 6, which is attached to an electrode wire 7 projected into the reference electrolyte. In order that faults may be prevented, the connecting wire 7 should at all times be submerged in reference electrolyte. However, the reference electrode may be operated for too prolonged a period, without refilling reference electrolyte in time, and in that case the reference electrolyte level could fall so low, that the connecting wire 7 no longer is surrounded by reference electrolyte. For preventing this, the connecting wire 7 projects into a cup-shaped depression 8. As the reference electrolyte leaks from the exit apertures 2, the boundary 9 between the reference electrolyte 1 and the silicone fluid 3 floating upon it falls. When the boundary 9 has reached the upper edge of the cup-shaped depression 8, the boundary in the cup-shaped depression falls no longer, even through the boundary in the outer annular chamber can continue to fall. Even in that case, the cup-shaped depression 8 remains filled with reference electrolyte, so that the connecting wire 7 remains surrounded by reference electrolyte at all times.

As the reference electrode according to the invention comprises no moving parts at all, there is no risk of binding. The narrow exit apertures 2 cannot become clogged, since they are continually flushed with clean reference electrolyte from within. The porous plug 4 could basically become clogged by a contaminated ambient fluid, since this ambient fluid enters through the plug 4. However, it presents no difficulty to provide the porous plug 4 with a sufficiently large surface for ensuring that even in a heavily contaminated surroundings, this plug can never become clogged over its entire surface. Therefore, a proper operation of the reference electrode according to the invention is ensured under all circumstances.

It shall now be considered, how the leakage of reference electrolyte from the exit apertures can be ensured irrespective of the specific gravity of the surrounding process fluid. Let the height of the reference electrolyte column above the exit apertures be E, the height of the boundary 9, between the reference electrolyte and the silicone fluid, above the lower boundary of the silicone fluid column be S and the distance between the exit apertures 2 and the lower silicone fluid column boundary be P. Further, let the specific gravity of the process fluid surrounding the reference electrode be $p$, the specific gravities of the reference electrolyte and the silicone fluid being 1.2 and 0.85 respectively.

For leakage in the desired direction it is required that:

$1.2E + p \times P \geq 0.85S$ or
$1.2E + p \times P \geq 0.85E + 0.85P$ or
$0.35E \geq (0.85-p)P$ or $$E \geq \frac{0.85-p}{0.35}P$$

The right-hand term is larger as $p$ is smaller. Leakage in the desired direction is therefore ensured for any value of $p$ (negative values being impossible), if:

$$E \geqq \frac{0.85}{0.35} P$$

Provided $$\left|\Delta E\right| \leqq \frac{0.85}{0.35} \left|\Delta P\right|$$

this also holds as the electrode empties and $E$ as well as $P$ become smaller. This makes it necessary, that the surface of the boundary 9 be at least $$\frac{0.85}{0.35}$$

times as large as the surface of the column section at 4.

I claim:

1. A reference electrode for measuring ion potentials comprising wall means forming a vertically extending housing divided into a vertically extending first chamber and a vertically extending second chamber, said first chamber being coextensive with said second chamber from its lower end for the major portion of its height, said housing having a lower end arranged to be submerged into the fluid to be measured and an oppositely disposed upper end, said first chamber and second chamber communicating with one another within said housing intermediate its upper and lower ends, said first chamber having a narrow exit aperture to the exterior of said housing and said aperture being spaced downwardly from the point at which said first and second chambers communicate, said first chamber arranged to contain an electrolyte capable of leaking outwardly from said exit aperture, said second chamber arranged to contain a fluid having a high viscosity and a lower specific gravity that the electrolyte in said first chamber, means in said second chamber adjacent the lower end of said housing for permitting communication between said second chamber and the exterior of said housing and for retaining the fluid within said second chamber from leakage through said means while admitting the fluid to be measured through said means into said second chamber, and said exit aperture from said first chamber being spaced upwardly from the lower end of said housing and from said means in said second chamber and the point at which said first and second chambers communicate being a greater distance upwardly from the lower end of said housing than said exit aperture.

2. A reference electrode, as set forth in claim 1, wherein an electrode wire extends into said housing from the upper end thereof and is positioned within said first chamber therein, a cup-shaped depression formed by said wall means within said first chamber and being arranged to contain a supply of the electrolyte in said first chamber, the opening from said depression facing toward the upper end of said housing and the end of said electrode wire projecting into said depression.

3. A reference electrode, as set forth in claim 2, wherein said depression is located between said exit aperture and the point of communication between said first and second chambers.

4. A reference electrode, as set forth in claim 3, wherein said housing comprises a longitudinally extending tubular member having a smaller transverse cross sectional area from its lower end to a point intermediate its lower and upper ends than the transverse cross-sectional area extending from the intermediate point to the upper end of said housing.

5. A reference electrode, as set forth in claim 4, wherein said housing being open at its lower end for affording communication thereat between said second chamber and the exterior of said housing, said means in said second chamber adjacent the lower end of said housing comprising a porous plug located at the lower end of said housing for affording communication between said second chamber and the exterior of said housing, and said wall means forming said housing divided into said first and second chambers comprising an inner tubular member spaced inwardly from and extending vertically through said housing from the part thereof having the smaller transverse cross-sectional area to the part having the larger transverse cross-sectional area, and said inner tubular member enclosing at least a vertically extending part of said second chamber.

6. A reference electrode, as set forth in claim 5, wherein said inner tubular member being open at its end closer to the upper end of said housing and providing communication at the opening between said first and second chambers and the opening in said inner tubular member being located in the part of said housing having the larger transverse cross-sectional area.

7. A reference electrode, as set forth in claim 6, wherein said inner tubular member having a transverse cross-sectional area smaller than the corresponding transverse cross-sectional area of said housing thereby providing an annular space therebetween and forming in part said first chamber within said housing.

8. A reference electrode, as set forth in claim 7, wherein said exit aperture being located in the part of said housing having the smaller transverse cross-sectional area and being spaced from said plug in the first end of said housing.

9. A reference electrode, as set forth in claim 8, wherein said inner tubular member being deformed within the portion of said housing having the larger transverse cross-sectional area and forming said cup-shaped depression, said inner tubular member having a reduced diameter tubular section extending upwardly from said deformed section.

* * * * *